United States Patent
Kim

(10) Patent No.: US 8,774,802 B2
(45) Date of Patent: Jul. 8, 2014

(54) METHOD AND APPARATUS FOR EPLMN LIST MANAGEMENT IN MOBILE TERMINAL

(75) Inventor: Hong Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 13/228,817

(22) Filed: Sep. 9, 2011

(65) Prior Publication Data

US 2012/0064883 A1 Mar. 15, 2012

(30) Foreign Application Priority Data

Sep. 13, 2010 (KR) ........................ 10-2010-0089279

(51) Int. Cl.
*H04W 4/00* (2009.01)

(52) U.S. Cl.
USPC ............... 455/435.1; 455/435.2; 455/435.3; 455/422.1; 455/432.1; 455/432.2; 455/456.1; 455/558; 370/254; 370/328; 370/329

(58) Field of Classification Search
USPC ........ 455/415, 436, 440, 432.1, 432.2, 432.3, 455/434, 435.1, 435.2, 422.1, 456.1, 558; 370/254, 328, 329
See application file for complete search history.

(56) References Cited

U.S. PATENT DOCUMENTS

| | | | |
|---|---|---|---|
| 5,586,338 A * | 12/1996 | Lynch et al. | 455/433 |
| 6,387,027 B1 * | 5/2002 | Bodin | 455/419 |
| 6,961,569 B2 * | 11/2005 | Raghuram et al. | 455/435.1 |
| 7,089,001 B2 * | 8/2006 | Leung et al. | 455/433 |
| 7,519,365 B2 * | 4/2009 | Dorsey et al. | 455/435.1 |
| 7,630,711 B2 * | 12/2009 | Nagaraj et al. | 455/432.1 |
| 8,160,976 B2 * | 4/2012 | Dwyer et al. | 706/12 |
| 2003/0045290 A1 * | 3/2003 | Tuohimetsa et al. | 455/435 |
| 2004/0110503 A1 * | 6/2004 | Park | 455/435.1 |
| 2004/0192304 A1 * | 9/2004 | Casaccia et al. | 455/435.1 |
| 2005/0254469 A1 | 11/2005 | Verma et al. | |
| 2010/0075670 A1 * | 3/2010 | Wu | 455/434 |
| 2010/0167738 A1 * | 7/2010 | Kim | 455/435.2 |
| 2011/0244858 A1 * | 10/2011 | Callender | 455/436 |
| 2012/0044869 A1 * | 2/2012 | Tiwari | 370/328 |

OTHER PUBLICATIONS

Motorola et al., "Equivalent handling of PLMNs with different PLMN codes", 3GPP TSG-SA Plenary Meeting #11, Palm Springs, CA, U.S.A. Tdoc SP-010020, Revision of N1-010381, Mar. 2001.
MCC Support, "3rd Generation Partnership Project; Technical Specification Group Core Network and Terminals; Mobile Radio Interface Layer 3 specification; Core network protocols; Stage 3 (Release 9)", Jun. 2010, pp. 1, 2, 87, 88, 91, 92, 124, 125, 290, 332, 333, 345 and 346.

* cited by examiner

*Primary Examiner* — Olumide T Ajibade Akonai
(74) *Attorney, Agent, or Firm* — Jefferson IP Law, LLP

(57) ABSTRACT

An apparatus and method for Equivalent Public Land Mobile Network (EPLMN) list management in a mobile terminal are provided. The method includes receiving a message from a network after storing an EPLMN list having at least one PLMN entry, determining whether an EPLMN list is present in the received message, and performing EPLMN list management by maintaining, when an EPLMN list is not present in the received message, the stored EPLMN list. As a result, the mobile terminal may retain an accurate EPLMN list and efficiently perform cell selection/reselection.

20 Claims, 8 Drawing Sheets

METHOD AND APPARATUS FOR EPLMN LIST MANAGEMENT IN MOBILE TERMINAL

PRIORITY

This application claims the benefit under 35 U.S.C. §119 (a) of a Korean patent application filed on Sep. 13, 2010 in the Korean Intellectual Property Office and assigned Serial No. 10-2010-0089279, the entire disclosure of which is hereby incorporated by reference.

BACKGROUND OF THE INVENTION

1. Field of the Invention

The present invention relates to mobile communication. More particularly, the present invention relates to a method and apparatus for managing a list of equivalent public land mobile networks in a mobile terminal.

2. Description of the Related Art

A mobile terminal may place a call to another mobile terminal or receive content data from a content server through a network. The network configured to support voice and data communication is referred to as a Public Land Mobile Network (PLMN). A mobile terminal may receive a message such as a location update accept message from the PLMN covering the current location, wherein the location update accept message contains a list of Equivalent PLMNs (EPLMN list). PLMNs in the EPLMN list are regarded as equivalent to each other by the mobile terminal for PLMN selection or cell selection.

Whenever a particular message is received from the PLMN, the mobile terminal updates the stored EPLMN list. When received messages contain different EPLMN lists, the mobile terminal may fail to perform accurate PLMN selection or cell selection. Also, when networks in EPLMN relation are not described as being equivalent to each other, the mobile terminal may fail to perform accurate PLMN selection or cell selection. Accordingly, there is a need for an apparatus and method for EPLMN list management that enable a mobile terminal to perform accurate PLMN selection or cell selection.

SUMMARY OF THE INVENTION

Aspects of the present invention are to address the above-mentioned problems and/or disadvantages and to provide at least the advantages described below. Accordingly, an aspect of the present invention is to provide a method and apparatus for Equivalent Public Land Mobile Network (EPLMN) list management that enable a mobile terminal to perform accurate Public Land Mobile Network (PLMN) selection or cell selection.

In accordance with an aspect of the present invention, a method for EPLMN list management in a mobile terminal is provided. The method includes receiving a message from a network after storing an EPLMN list having at least one PLMN entry, determining whether an EPLMN list is present in the received message, and performing EPLMN list management by maintaining, when an EPLMN list is not present in the received message, the stored EPLMN list.

In accordance with another aspect of the present invention, a mobile terminal for managing an EPLMN list is provided. The terminal includes a wireless communication unit for receiving a message from a network, a storage unit for storing an EPLMN list having at least one PLMN entry, and a control unit for determining, when a message is received through the wireless communication unit, whether an EPLMN list is present in the received message, and for maintaining, when an EPLMN list is not present in the received message, an existing EPLMN list stored in the storage unit.

In an exemplary feature of the present invention, the apparatus and method enable a mobile terminal to maintain an accurate EPLMN list. Hence, the mobile terminal may efficiently perform PLMN selection and cell selection/reselection. The network operator may utilize the functionality of EPLMNs as intended, and mobile terminals may reduce power consumption in PLMN selection and rapidly initiate normal services.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, an exemplary mobile terminal of the present invention is preferably a Global System for Mobile communications (GSM) terminal or a Universal Mobile Telecommunications System (UMTS) terminal. However, this is not a limitation of the present invention and the mobile terminal may also be a Code Division Multiple Access (CDMA) terminal, a Wideband Code Division Multiple Access (WCDMA) terminal, an International Mobile Telecommunications 2000 (IMT-2000) terminal, a General Packet Radio Services (GPRS) terminal, and the like.

Figure 1:
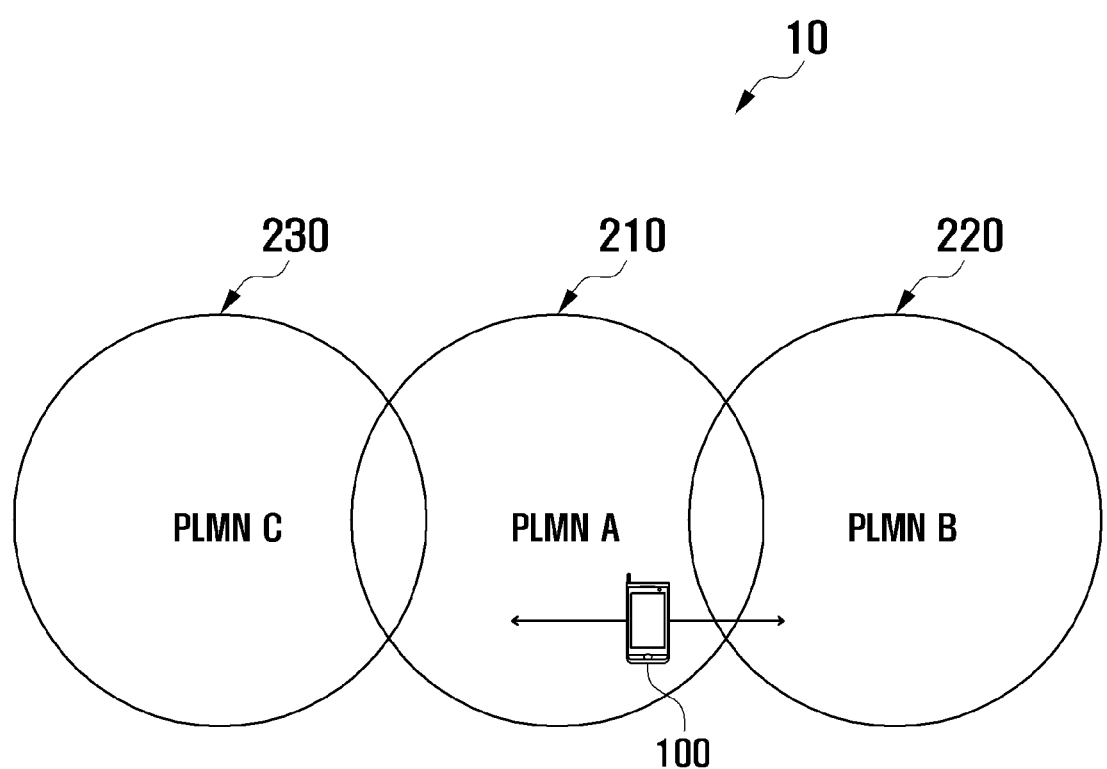
FIG. 1 illustrates a mobile communication system according to an exemplary embodiment of the present invention.

FIG. 1 illustrates a mobile communication system according to an exemplary embodiment of the present invention.

Referring to FIG. 1, the mobile communication system 10 includes a mobile terminal 100, Public Land Mobile Network (PLMN) A 210, PLMN B 220, and PLMN C 230. Each PLMN 210, 220 or 230 may include a plurality of Base Stations (BSs) for communicating with mobile terminals for voice and data communication, a plurality of Base Station Controllers (BSCs) for controlling multiple base stations, and a Mobile Switching Center (MSC) for controlling the overall network. In each PLMN 210, 220 or 230, the mobile switching center sends a message via a base station controller and a base station to the mobile terminal 100.

The mobile terminal 100 may travel within an area of a PLMN and may move to an area of another PLMN. During movement, the mobile terminal 100 may receive a location update accept message, an attach accept message, or a routing area update accept message from the PLMN. The mobile terminal 100 may receive a location update accept message from the current PLMN during execution of the location update procedure, receive an attach accept message from the current PLMN during execution of the attach procedure, and receive a routing area update accept message from the current PLMN during execution of the routing area update procedure.

In the following description, the GPRS attach procedure is illustrated as an example of network attachment.

When turned on, the mobile terminal 100 performs the location update procedure and GPRS attach procedure, and receives a location update accept message and a GPRS attach accept message from the current PLMN. When moved, the mobile terminal 100 receives a location update accept message and a routing area update accept message from the current PLMN.

In FIG. 1, the mobile terminal 100 is located in the area of PLMN A 210, and may move within the area of PLMN A 210 or move to the area of PLMN B 220. When moving within the area of PLMN A 210, the mobile terminal 100 receives a location update accept message and a routing area update accept message from PLMN A 210. When moving to the area of PLMN B 220, the mobile terminal 100 receives a location update accept message and a routing area update accept message from PLMN B 220.

The location update accept message, the GPRS attach accept message and the routing area update accept message contain an Equivalent PLMN (EPLMN) list. PLMNs in the EPLMN list are regarded as equivalent to each other by the mobile terminal 100. Entries of the EPLMN list include PLMN codes and each PLMN code may be composed of a Mobile Country Code (MCC) and a Mobile Network Code (MNC).

When storing the EPLMN list, the mobile terminal 100 may remove a forbidden PLMN from the EPLMN list. PLMNs in the stored EPLMN list are regarded as equivalent to each other by the mobile terminal 100 for PLMN selection, cell selection/reselection and handover. Whenever a location update accept message, a GPRS attach accept message, or a routing area update accept message is received, the mobile terminal 100 updates the stored EPLMN list.

The mobile terminal 100 may be aware of PLMNs in the vicinity on the basis of the EPLMN list, and may rapidly perform PLMN selection or cell selection/reselection using information regarding PLMNs in the vicinity. Exemplary embodiments of the present invention relate to a method for a mobile terminal to manage an EPLMN list contained in messages received from PLMNs.

Figure 2:
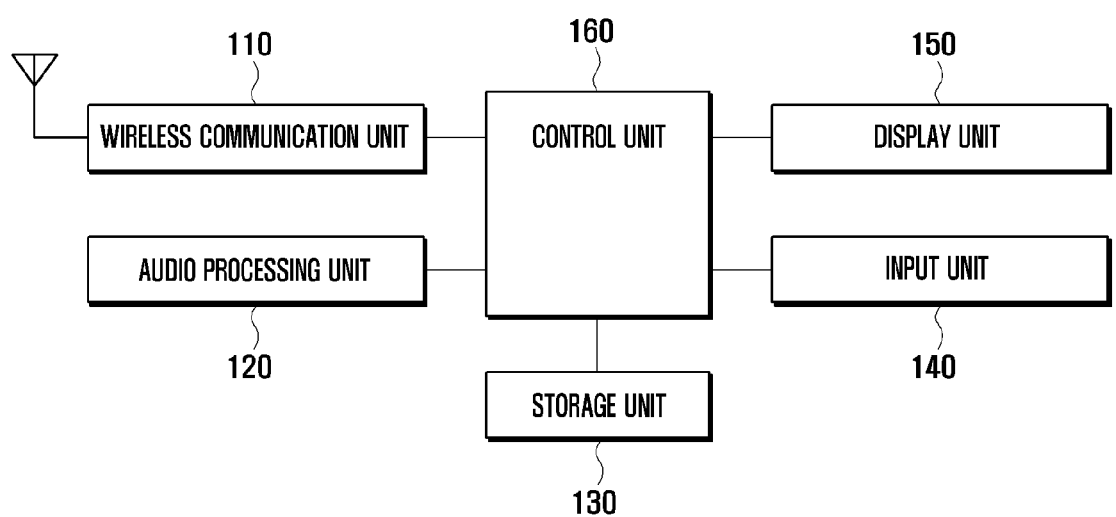
FIG. 2 is a block diagram of a mobile terminal according to an exemplary embodiment of the present invention.

FIG. 2 is a block diagram of a mobile terminal according to an exemplary embodiment of the present invention.

Referring to FIG. 2, the mobile terminal 100 includes a wireless communication unit 110, an audio processing unit 120, a storage unit 130, an input unit 140, a display unit 150, and a control unit 160.

The wireless communication unit 110 sends and receives data for wireless communication of the mobile terminal 100. The wireless communication unit 110 may include a radio frequency transmitter for upconverting the frequency of a signal to be transmitted and amplifying the signal, and a radio frequency receiver for low-noise amplifying a received signal and downconverting the frequency of the signal. The wireless communication unit 110 may receive data through a wireless channel and forward the received data to the control unit 160, and may transmit data from the control unit 160 through the wireless channel. More particularly, the wireless communication unit 110 receives messages from the PLMN under control of the control unit 160.

The audio processing unit 120 may include a coder/decoder (codec). The codec may include a data codec for processing packet data, and an audio codec for processing an audio signal such as a voice signal. The audio processing unit 120 converts a digital audio signal into an analog audio signal through the audio codec and outputs the analog audio signal to a speaker, and also converts an analog audio signal from a microphone into a digital audio signal through the audio codec.

The storage unit 130 stores programs and data necessary for operation of the mobile terminal 100, and may include a program region and a data region. The program region may store a control program for controlling the overall operation of the mobile terminal 100, an Operating System (OS) for booting the mobile terminal 100, an application program for playing back multimedia content, and application programs necessary for optional functions of the mobile terminal 100 related to photography, sound, and still and moving images. The data region stores data generated in the course of using the mobile terminal 100, such as still images, moving images, phonebooks, audio data, and the like. More particularly, the storage unit 130 stores an EPLMN list contained in a message received from the PLMN.

The input unit 140 generates a key signal corresponding to user manipulation and sends the key signal to the control unit 160. The input unit 140 may include a keypad having alphanumeric and direction keys arranged in a 3*4 or Qwerty layout, or a touch panel. The input unit 140 may further include a button key, a jog key and a wheel key.

The display unit 150 may be realized using Liquid Crystal Display (LCD) devices, Organic Light Emitting Diodes (OLED), or Active Matrix Organic Light Emitting Diodes (AMOLED). The display unit 150 provides the user with various information such as menus, input data, and function-setting data in a visible form.

The control unit 160 controls operations of the components of the mobile terminal 100. More particularly, the control unit 160 controls the wireless communication unit 110 to receive a message containing an EPLMN list having at least one entry from the network. The control unit 160 determines whether an EPLMN list is present in a received message. When an EPLMN list is present in the received message, the control unit 160 stores the EPLMN list in the storage unit 130. Later, when a message is received from the PLMN through the wireless communication unit 110, the control unit 160 determines whether an EPLMN list is present in the received message. When an EPLMN list is not present in the received message, the control unit 160 maintains the existing EPLMN list stored in the storage unit 130. And, when an EPLMN list is present in the received message, the control unit 160 updates the existing EPLMN list stored in the storage unit 130.

In an exemplary implementation, when an EPLMN list is not present in the received message, the control unit 160 may determine whether the PLMN identifier of the received message is identical to that of the message having carried the EPLMN list stored in the storage unit 130. When the PLMN identifier of the received message is identical to that of the message having carried the EPLMN list stored in the storage unit 130, the control unit 160 maintains the existing EPLMN list stored in the storage unit 130. Otherwise, the control unit 160 updates the EPLMN list stored in the storage unit 130.

In an exemplary implementation, when an EPLMN list is present in the received message, the control unit 160 may determine whether the EPLMN list of the received message is contained in the existing stored EPLMN list (i.e., a subset). When the newly received EPLMN list is contained in the stored EPLMN list, the control unit 160 maintains the stored EPLMN list. Otherwise, the control unit 160 updates the stored EPLMN list by adding an entry of the newly received EPLMN list not belonging to the stored EPLMN list to the stored EPLMN list.

When the mobile terminal 100 is moved to an area of a new PLMN, the control unit 160 receives a message from the new PLMN. The control unit 160 may determine whether the message is received from a PLMN listed in the existing EPLMN list stored in the storage unit 130. When the message is received from a PLMN listed in the existing stored EPLMN list, the control unit 160 determines whether an EPLMN list is present in the received message. When an EPLMN list is not present in the received message, the control unit 160 maintains the existing EPLMN list stored in the storage unit 130. When an EPLMN list is present in the received message, the control unit 160 updates the existing EPLMN list stored in the storage unit 130. When the message is not received from a PLMN listed in the existing EPLMN list stored in the storage unit 130, the control unit 160 updates the existing stored EPLMN list.

In an exemplary implementation, when an EPLMN list is present in the received message, the control unit 160 determines whether the EPLMN list of the received message is contained in the existing stored EPLMN list (i.e., a subset). When the newly received EPLMN list is contained in the stored EPLMN list, the control unit 160 maintains the stored EPLMN list. Otherwise, the control unit 160 updates the stored EPLMN list by adding an entry of the newly received EPLMN list not belonging to the stored EPLMN list to the stored EPLMN list.

Figure 3:
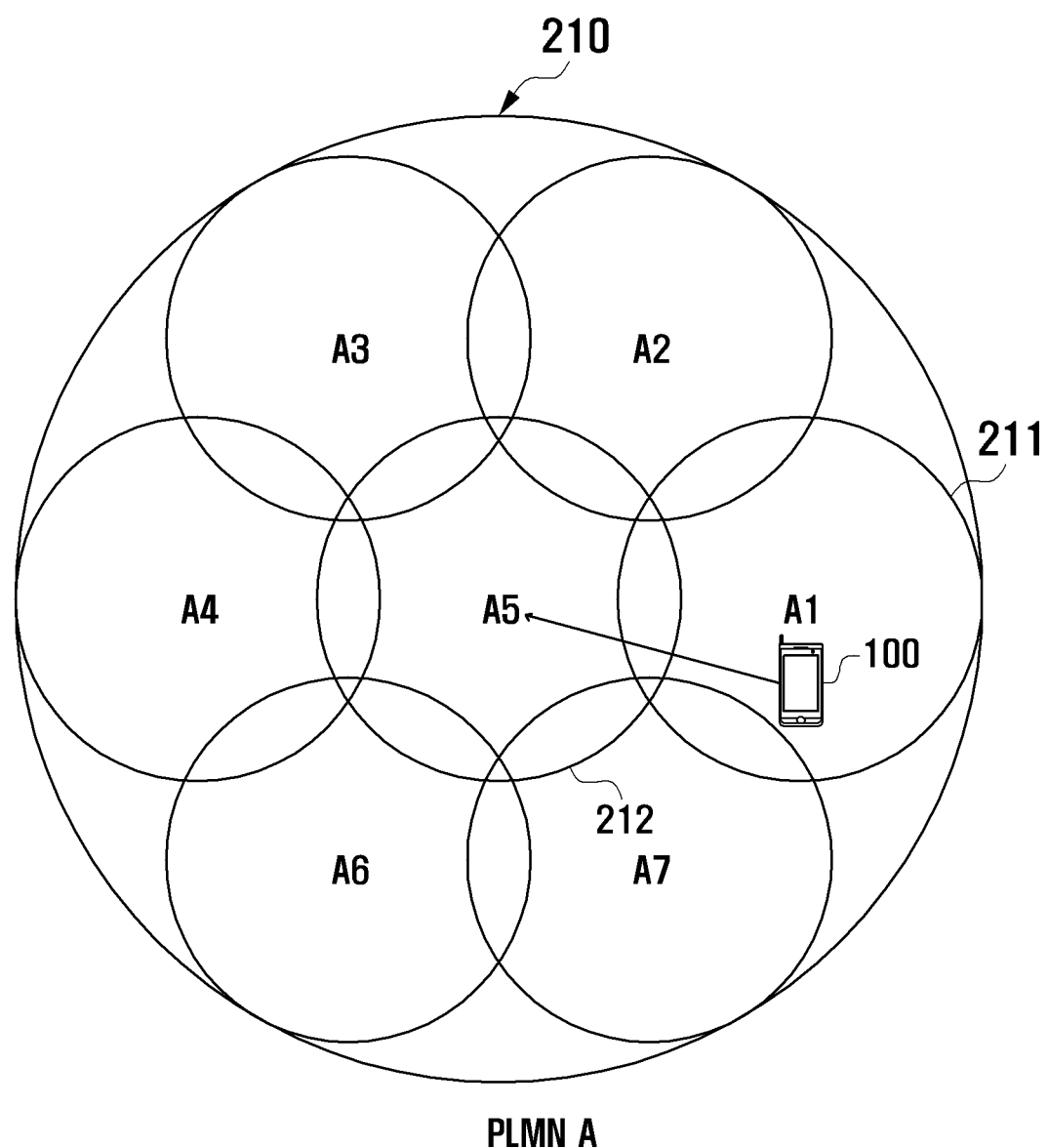
FIG. 3 depicts movement of a mobile terminal within a Public Land Mobile Network (PLMN) A according to an exemplary embodiment of the present invention.

FIG. 3 depicts movement of a mobile terminal within a PLMN A according to an exemplary embodiment of the present invention.

Referring to FIG. 3, PLMN A 210 is composed of multiple cells A1 to A7. The mobile terminal 100 is located in cell A1 211 and moves from cell A1 211 to cell A5 212. The following description is related to management of the EPLMN list when the mobile terminal 100 moves between cells within the same PLMN.

Figure 4:
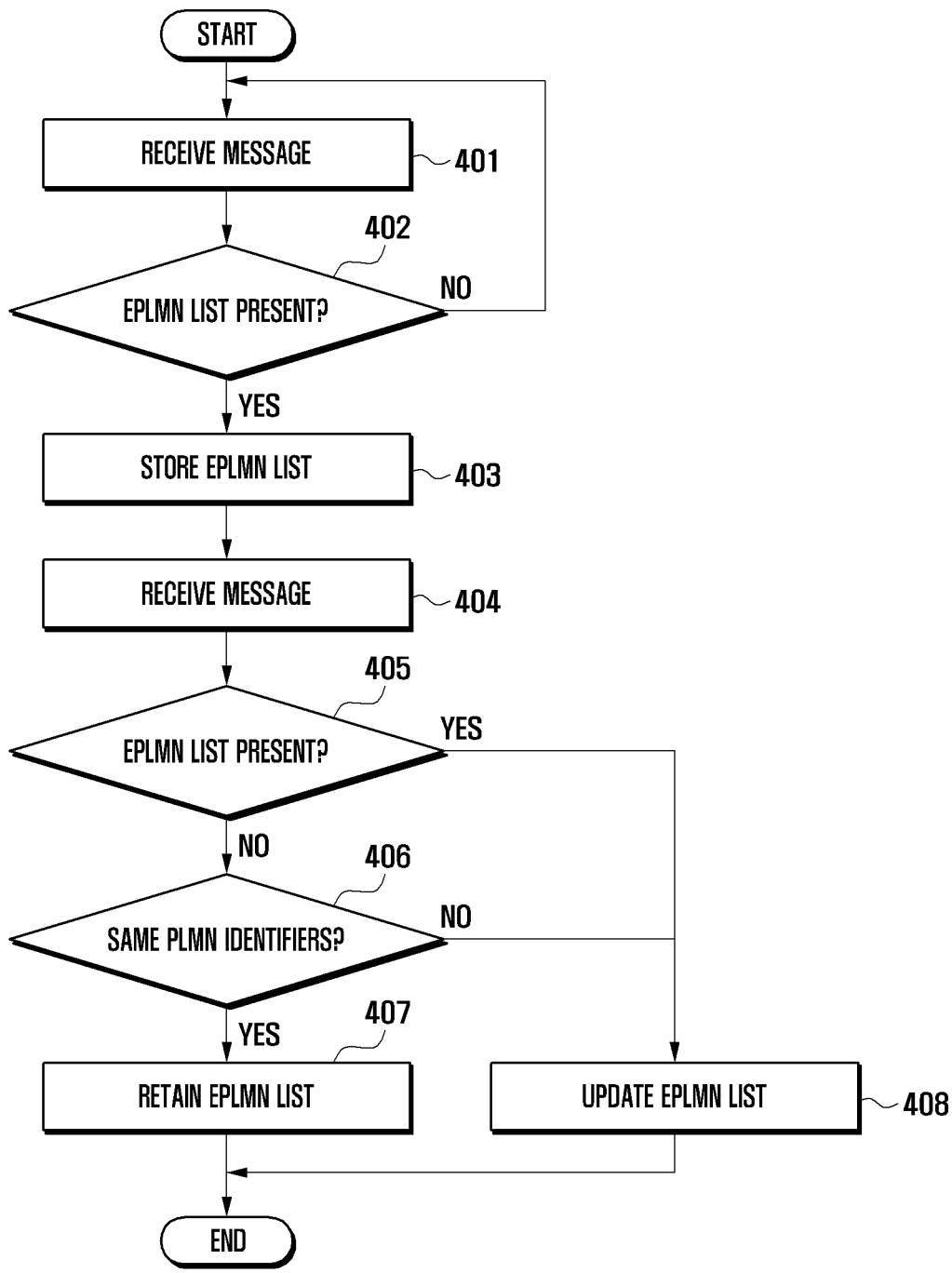
FIG. 4 is a flowchart of a method for Equivalent PLMN (EPLMN) list management according to a first exemplary embodiment of the present invention.

FIG. 4 is a flowchart of a method for EPLMN list management according to a first exemplary embodiment of the present invention.

Referring to FIG. 4, the control unit 160 of the mobile terminal 100 controls the wireless communication unit 110 to receive a message from the current PLMN in step 401. When the mobile terminal 100 initially connects to the PLMN after being powered on, the control unit 160 controls the wireless communication unit 110 to perform the location update procedure and the GPRS attach procedure, and receives a location update accept message and a GPRS attach accept message from the PLMN through the wireless communication unit 110. In FIG. 3, the control unit 160 receives a location update accept message and a GPRS attach accept message from PLMN A 210 through the wireless communication unit 110.

When the mobile terminal 100 moves between cells after being powered on, the control unit 160 controls the wireless communication unit 110 to perform the location update procedure and the routing area update procedure, and receives a location update accept message and a routing area update accept message from the PLMN through the wireless communication unit 110. In FIG. 3, the control unit 160 receives a location update accept message and a routing area update accept message from PLMN A 210 through the wireless communication unit 110.

A message received by the mobile terminal 100 from the PLMN includes an EPLMN list and a PLMN identifier. In the description, PLMN identifiers are unique identifiers distinguishing PLMNs. The location update accept message may include an EPLMN list as an "equivalent PLMNs" information element and a PLMN identifier as a "location area identification" information element. The GPRS attach accept message and the routing area update accept message may include an EPLMN list as an "equivalent PLMNs" information element and a PLMN identifier as a "routing area identification" information element. In addition, the message from the PLMN includes a presence indication indicating the presence of an EPLMN list in the message. At step 401, a message is received when no EPLMN list is stored in the storage unit 130.

The control unit 160 determines whether an EPLMN list is present in the received message in step 402. The control unit 160 may determine whether an EPLMN list is present in the received message by examining the presence indication for the EPLMN list. When an EPLMN list is not present in the received message, the control unit 160 returns to step 401 and receives a message through the wireless communication unit 110.

When an EPLMN list is present in the received message, the control unit 160 stores the EPLMN list in the storage unit 130 in step 403.

Later, the control unit 160 receives a message through the wireless communication unit 110 in step 404. The mobile terminal 100 is assumed to have moved to a new area after step 403. In FIG. 3, the mobile terminal 100 moves from cell A1 211 to cell A5 212. In movement to cell A5 212, the mobile terminal 100 performs the location update procedure and the routing area update procedure and receives a location update accept message and a routing area update accept message from PLMN A 210. That is, the mobile terminal 100 receives a new message at step 404 after movement while having a stored EPLMN list in the storage unit 130.

The control unit 160 determines whether an EPLMN list is present in the received message in step 405. The control unit 160 may determine the presence of an EPLMN list in the message by examining the presence indication for the EPLMN list.

When an EPLMN list is not present in the received message, the control unit 160 determines whether the PLMN identifier of the message received at step 404 is identical to that of the message having carried the EPLMN list stored in the storage unit 130 (i.e., message received at step 401) in step 406. This is to determine whether the messages have been sent by the same PLMN.

When the PLMN identifier of the message received at step 404 is not identical to that of the message received at step 401, the control unit 160 performs EPLMN list update in step 408. That is, the existing EPLMN list stored in the storage unit 130 is replaced with the EPLMN list contained in the message received at step 404. Difference of the PLMN identifiers indicates movement of the mobile terminal 100 to an area of a new PLMN. In this case, it is necessary for the mobile terminal 100 to update existing EPLMN information with information on PLMNs regarded as equivalent by the new PLMN. Hence, when the PLMN identifiers of the messages differ, the control unit 160 performs EPLMN list update.

When it is determined in step 406 that the PLMN identifier of the message received at step 404 is identical to that of the message received at step 401, the control unit 160 maintains the EPLMN list stored in the storage unit 130 in step 407. That is, EPLMN list update is not performed.

In the related art, when a message not containing an EPLMN list is received while an existing EPLMN list is stored, the existing stored EPLMN list is deleted. In this case, the mobile terminal may experience difficulty in PLMN selection and cell selection/reselection owing to absence of an EPLMN list. In exemplary embodiments of the present invention, when an EPLMN list is not present in a received message, the existing stored EPLMN list is retained, thereby preventing unnecessary EPLMN list removal.

When it is determined that an EPLMN list is present in the received message at step 405, the control unit 160 performs EPLMN list update in step 408.

In the first exemplary embodiment of FIG. 4, step 406 may be eliminated. In this case, when an EPLMN list is not present in the received message at step 405, the control unit 160 may retain the EPLMN list stored in the storage unit 130 at step 407. And when an EPLMN list is present in the received message, the control unit 160 may perform EPLMN list update at step 408.

In addition, step 406 may precede step 405. That is, when the control unit 160 receives a message from the PLMN at step 404, the control unit 160 may perform PLMN identifier comparison first, and determine for presence of an EPLMN list in the message received at step 404.

Figure 5:
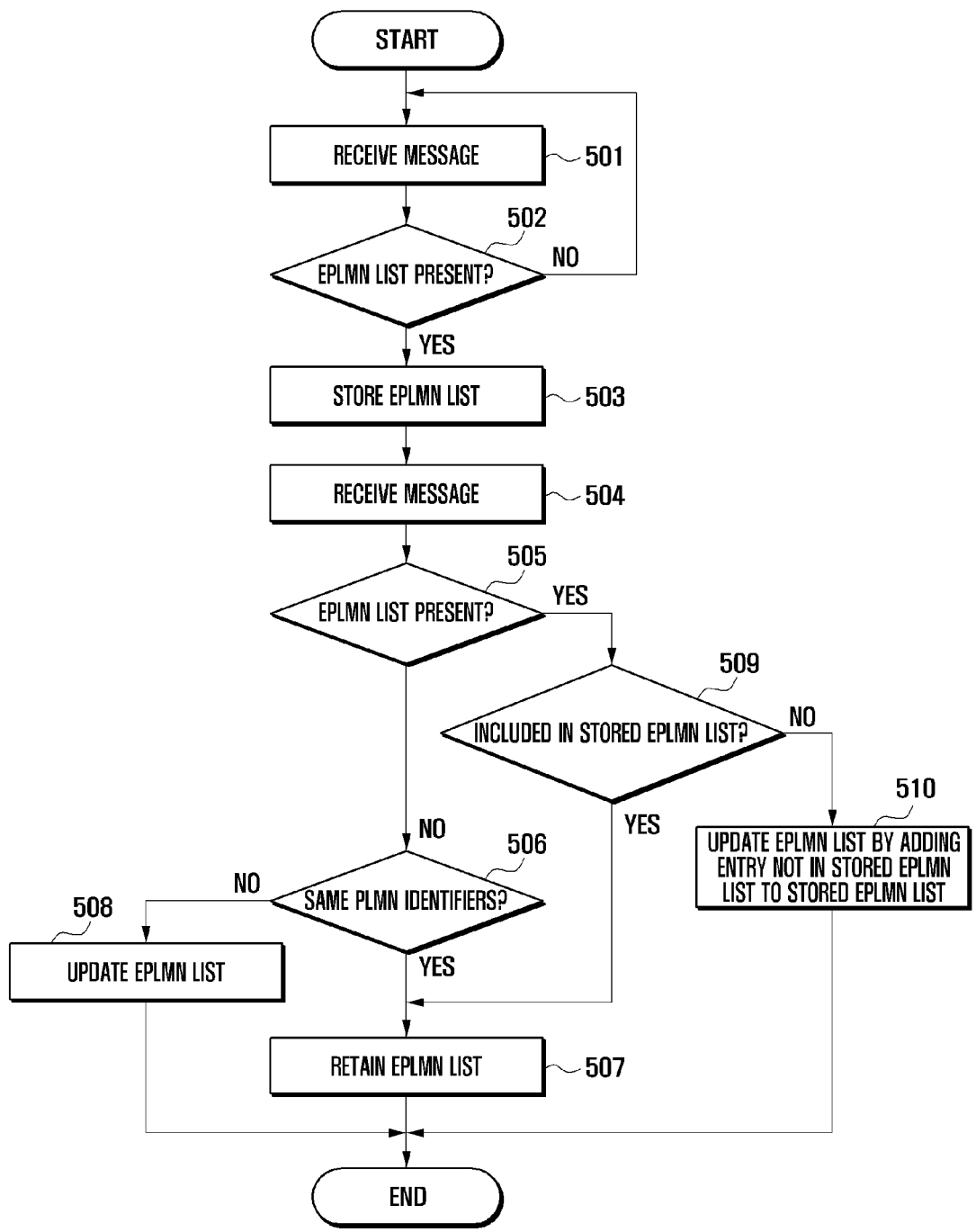
FIG. 5 is a flowchart of a method for EPLMN list management according to a second exemplary embodiment of the present invention.

FIG. 5 is a flowchart of a method for EPLMN list management according to a second exemplary embodiment of the present invention. In the second exemplary embodiment, EPLMN list comparison is added to the method of the first exemplary embodiment.

Steps 501 to 508 of FIG. 5 are identical respectively to steps 401 to 408 of FIG. 4. Hence, descriptions of steps 401 to 408 in FIG. 4 apply to steps 501 to 508.

When it is determined in step 505 that an EPLMN list is present in the message received at step 504, the control unit 160 determines whether the EPLMN list in the message received at step 504 is included (i.e., a subset) in the existing EPLMN list stored in the storage unit 130 in step 509. That is, the control unit 160 performs EPLMN list comparison. For example, it may be assumed that the stored EPLMN list includes PLMN A, PLMN B and PLMN C and the received EPLMN list includes PLMN A and PLMN B. As all entries of the received EPLMN list belong to the stored EPLMN list, the control unit 160 will determine that the EPLMN list in the received message is included in the existing stored EPLMN list. As another example, it may be assumed that the stored EPLMN list includes PLMN A, PLMN B and PLMN C and the received EPLMN list includes PLMN A, PLMN B, PLMN C and PLMN D. As PLMN D of the received EPLMN list does not belong to the stored EPLMN list, the control unit 160 will determine that the EPLMN list in the received message is not included in the existing stored EPLMN list.

When it is determined in step 509 that the EPLMN list in the message received at step 504 is included in the existing EPLMN list stored in the storage unit 130, the control unit 160 maintains the EPLMN list stored in the storage unit 130 in step 507. As the existing EPLMN list contains necessary PLMNs, it is unnecessary to perform EPLMN list update and the control unit 160 retains the stored EPLMN list.

When it is determined in step 509 that the EPLMN list in the message received at step 504 is not included in the existing EPLMN list stored in the storage unit 130, the control unit 160 updates the stored EPLMN list by adding an entry of the EPLMN list in the message not belonging to the stored EPLMN list to the stored EPLMN list in step 510. That is, the stored EPLMN list is updated so as to include a new entry. For example, when the stored EPLMN list includes PLMN A, PLMN B and PLMN C and the received EPLMN list includes PLMN A, PLMN B, PLMN C and PLMN D, the control unit 160 adds PLMN D (entry not belonging to the stored EPLMN list) to the stored EPLMN list. Hence, the stored EPLMN list has PLMN A, PLMN B, PLMN C and PLMN D after update.

In the second exemplary embodiment, the mobile terminal 100 not only examines for the presence of the EPLMN list but also compares PLMN entries of the EPLMN lists. Hence, it is possible to effectively perform EPLMN list update.

Figure 6:
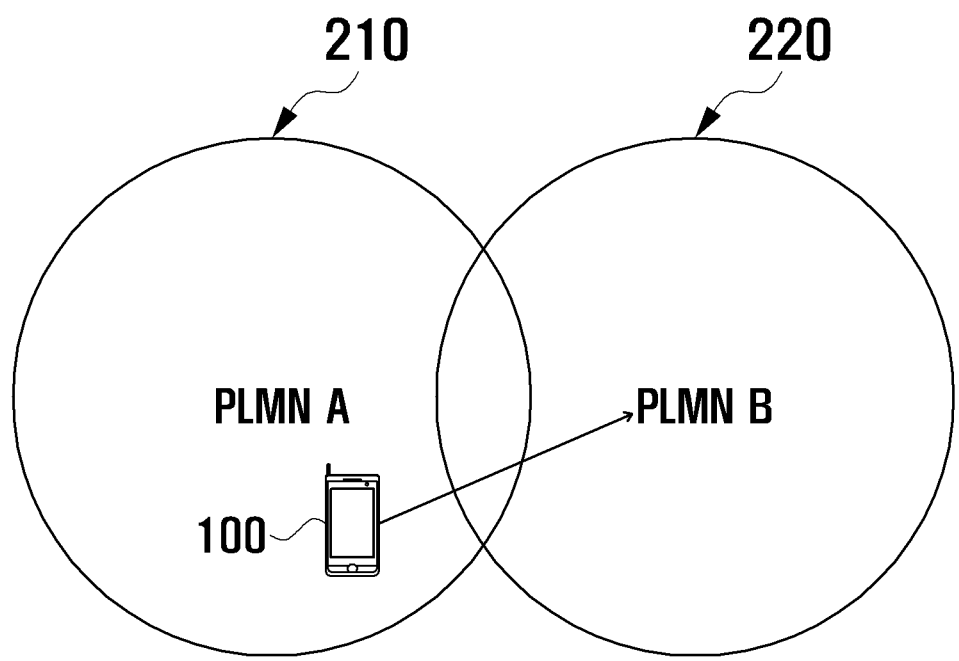
FIG. 6 depicts movement of a mobile terminal from a PLMN A to a PLMN B according to an exemplary embodiment of the present invention.

FIG. 6 depicts movement of a mobile terminal from a PLMN A to a PLMN B according to an exemplary embodiment of the present invention. The following description relates to EPLMN list management when the mobile terminal 100 moves from one PLMN to another PLMN.

Figure 7:
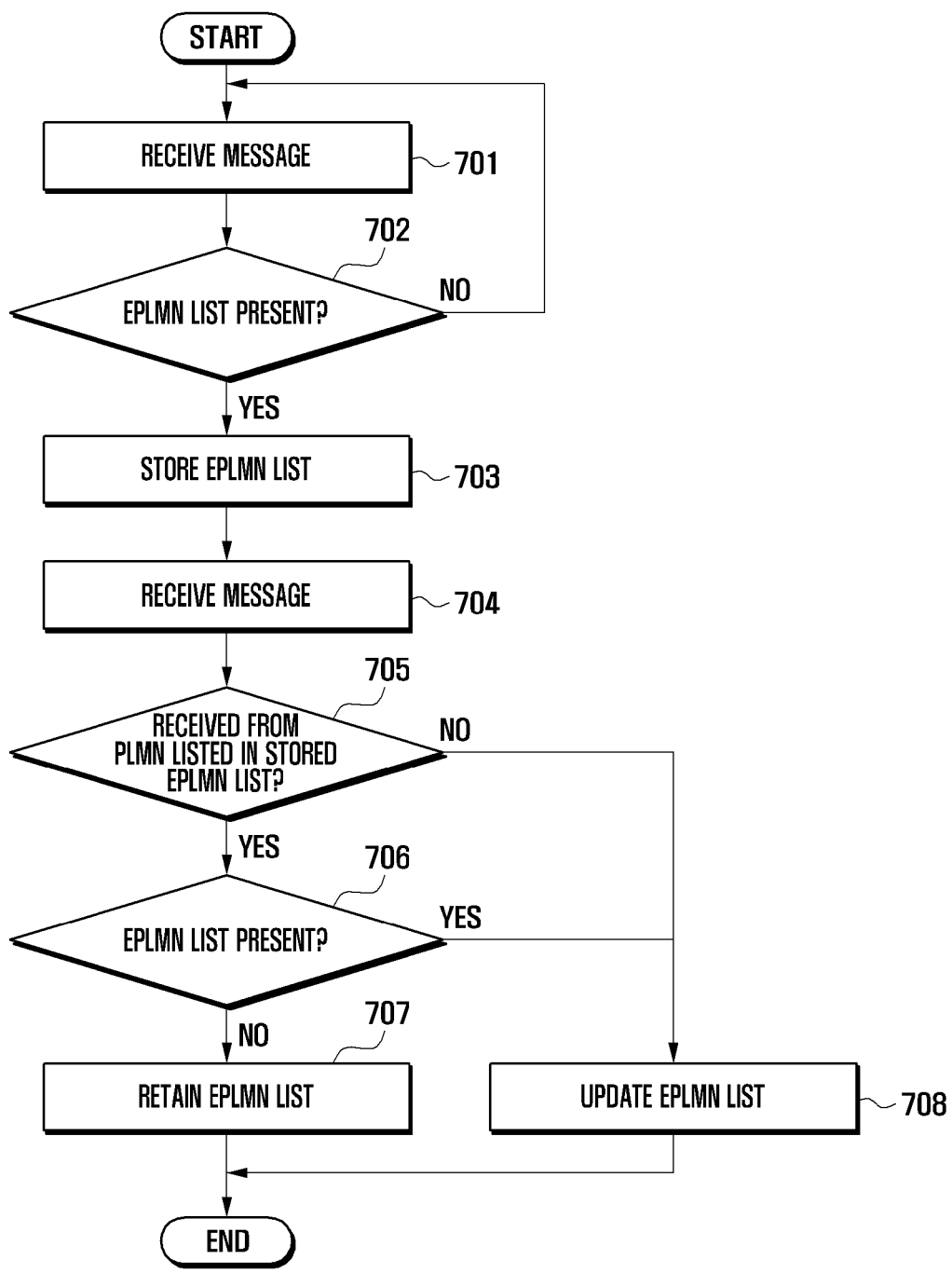
FIG. 7 is a flowchart of a method for EPLMN list management according to a third exemplary embodiment of the present invention.

FIG. 7 is a flowchart of a method for EPLMN list management according to a third exemplary embodiment of the present invention.

Referring to FIG. 7, the control unit 160 of the mobile terminal 100 controls the wireless communication unit 110 to receive a message from the current PLMN in step 701. When the mobile terminal 100 initially connects to the PLMN after being powered on, the control unit 160 controls the wireless communication unit 110 to perform the location update procedure and the GPRS attach procedure, and receives a location update accept message and a GPRS attach accept message from the PLMN through the wireless communication unit 110. In FIG. 6, the control unit 160 receives a location update accept message and a GPRS attach accept message from PLMN A 210 through the wireless communication unit 110.

When the mobile terminal 100 moves to an area of a new PLMN after being powered on, the control unit 160 controls the wireless communication unit 110 to perform the location update procedure and the routing area update procedure, and receives a location update accept message and a routing area update accept message from the PLMN through the wireless communication unit 110. In FIG. 6, when the mobile terminal 100 moves from PLMN A 210 to PLMN B 220, the control unit 160 receives a location update accept message and a routing area update accept message from PLMN B 220 through the wireless communication unit 110. As in the first and second exemplary embodiments, a message from the PLMN includes an EPLMN list and a PLMN identifier. The description of the EPLMN list and the PLMN identifier provided for the first and second embodiments is applied to the third and fourth exemplary embodiments. At step 701, a message is received when no EPLMN list is stored in the storage unit 130.

The control unit 160 determines whether an EPLMN list is present in the received message in step 702. The control unit 160 may determine whether an EPLMN list is present in the received message by examining the presence indication for the EPLMN list. When an EPLMN list is not present in the received message, the control unit 160 returns to step 701 and receives a message through the wireless communication unit 110.

When an EPLMN list is present in the received message, the control unit 160 stores the EPLMN list in the storage unit 130 in step 703.

Later, the control unit 160 receives a message through the wireless communication unit 110 in step 704. The mobile terminal 100 is assumed to have moved to a new PLMN after step 703. In FIG. 6, the mobile terminal 100 moves from PLMN A 210 to PLMN B 220. In movement to PLMN B 220, the mobile terminal 100 performs the location update procedure and the routing area update procedure, and receives a location update accept message and a routing area update accept message from PLMN B 220. That is, the mobile terminal 100 receives a new message at step 704 after movement with an EPLMN list stored in the storage unit 130.

The control unit 160 determines whether the message received at step 704 is sent by a PLMN listed in the existing stored EPLMN list in step 705. A message sent by a PLMN has a PLMN identifier. The control unit 160 may compare the PLMN identifier of the message received at step 704 with PLMN entries of the existing stored EPLMN list. For example, when the existing stored EPLMN list includes PLMN A and PLMN B, the control unit 160 may determine whether the PLMN identifier of the received message is equal to PLMN A or PLMN B.

When the message received at step 704 is sent by a PLMN not listed in the existing stored EPLMN list, the control unit 160 performs EPLMN list update in step 708. The case that the message received at step 704 is sent by a PLMN not listed in the existing stored EPLMN list implies that the new PLMN is not an equivalent PLMN of the old PLMN. Hence, it is necessary for the mobile terminal 100 to update existing EPLMN information with information on PLMNs regarded as equivalent by the new PLMN. For example, it may be assumed that the stored EPLMN list includes PLMN A and PLMN B, and PLMN C regards PLMN C and PLMN D as equivalent. When the mobile terminal 100 moves to the area of PLMN C, the control unit 160 determines that PLMN C is not listed in the stored EPLMN list and replaces the stored EPLMN list with an EPLMN list having PLMN C and PLMN D.

When it is determined in step 705 that the message received at step 704 is sent by a PLMN listed in the existing stored EPLMN list, the control unit 160 determines whether an EPLMN list is present in the received message in step 706. The control unit 160 may determine the presence of an EPLMN list in the message by examining the presence indication for the EPLMN list as in step 702.

When an EPLMN list is not present in the received message, the control unit 160 maintains the EPLMN list stored in the storage unit 130 in step 707. That is, EPLMN list update is not performed.

When an EPLMN list is present in the received message, the control unit 160 performs EPLMN list update in step 708.

In the related art, when a message without an EPLMN list is received while an existing EPLMN list is stored, the existing stored EPLMN list is deleted. In an exemplary embodiment of the present invention, the mobile terminal 100 determines whether an EPLMN list is present in a received message to determine the necessity of EPLMN list update and retains the existing stored EPLMN list when EPLMN list update is not necessary, thereby preventing unnecessary EPLMN list removal.

In the exemplary third embodiment of FIG. 7, step 705 may be eliminated. In this case, after receiving a message at step 704, the control unit 160 may determine whether an EPLMN list is present in the received message at step 706. When an EPLMN list is not present in the received message, the control unit 160 may keep the EPLMN list stored in the storage unit 130 at step 707. And when an EPLMN list is present in the received message, the control unit 160 may perform EPLMN list update at step 708.

In addition, step 706 may precede step 705. That is, when the control unit 160 receives a message from the PLMN through the wireless communication unit 110 at step 704, the control unit 160 may determine the presence of an EPLMN list in the received message first and, when an EPLMN list is present, determine the PLMN having sent the received message.

Figure 8:
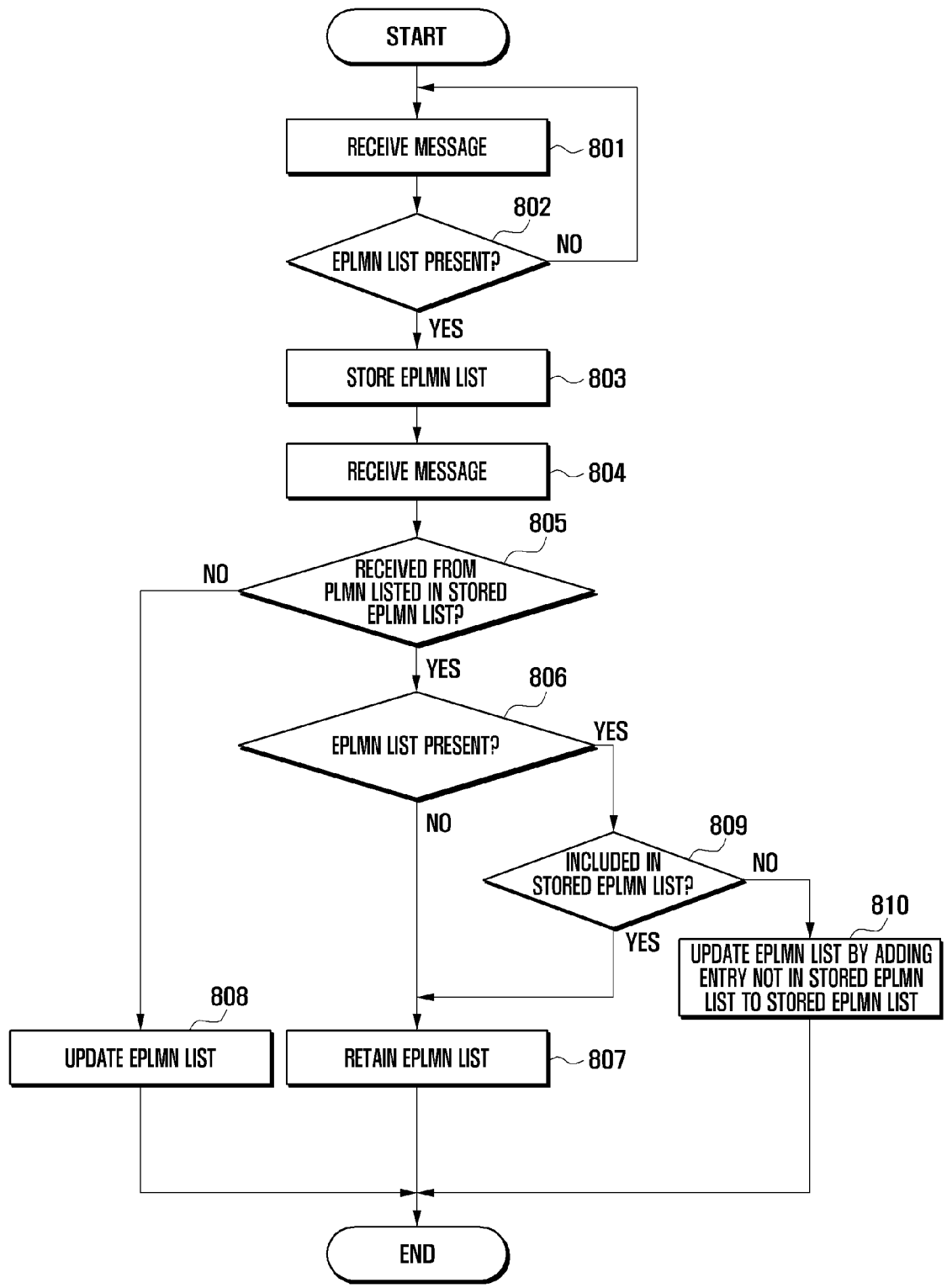
FIG. 8 is a flowchart of a method for EPLMN list management according to a fourth exemplary embodiment of the present invention.

FIG. 8 is a flowchart of a method for EPLMN list management according to a fourth exemplary embodiment of the present invention. In the fourth exemplary embodiment, EPLMN list comparison is added to the method of the third embodiment.

Steps 801 to 808 of FIG. 8 are identical respectively to steps 701 to 708 of FIG. 7. Hence, descriptions of steps 701 to 708 of FIG. 7 apply to steps 801 to 808.

When it is determined in step 806 that an EPLMN list is present in the message received at step 804, the control unit 160 determines whether the EPLMN list in the message received at step 804 is included in the existing EPLMN list stored in the storage unit 130 in step 809. That is, the control unit 160 performs EPLMN list comparison. For example, it may be assumed that the stored EPLMN list includes PLMN A, PLMN B and PLMN C and the received EPLMN list includes PLMN A and PLMN B. As all entries of the received EPLMN list belong to the stored EPLMN list, the control unit 160 will determine that the EPLMN list in the received message is included in the existing stored EPLMN list. As another example, it may be assumed that the stored EPLMN list includes PLMN A, PLMN B and PLMN C and the received EPLMN list includes PLMN A, PLMN B, PLMN C and PLMN D. As PLMN D of the received EPLMN list does not belong to the stored EPLMN list, the control unit 160 will determine that the EPLMN list in the received message is not included in the existing stored EPLMN list.

When the EPLMN list in the message received at step 804 is included in the existing EPLMN list stored in the storage unit 130, the control unit 160 maintains the EPLMN list stored in the storage unit 130 in step 807. As the existing EPLMN list contains necessary PLMNs, it is unnecessary to perform EPLMN list update and the control unit 160 retains the stored EPLMN list.

When it is determined in step 809 that the EPLMN list in the message received at step 804 is not included in the existing EPLMN list stored in the storage unit 130, the control unit 160 updates the stored EPLMN list by adding an entry of the EPLMN list in the message not belonging to the stored EPLMN list to the stored EPLMN list in step 810. That is, the stored EPLMN list is updated so as to include a new entry. For example, when the stored EPLMN list includes PLMN A, PLMN B and PLMN C and the received EPLMN list includes PLMN A, PLMN B, PLMN C and PLMN D, the control unit 160 adds PLMN D (entry not belonging to the stored EPLMN list) to the stored EPLMN list. Hence, the stored EPLMN list has PLMN A, PLMN B, PLMN C and PLMN D after update.

In the exemplary fourth embodiment, the mobile terminal 100 not only examines for the presence of the EPLMN list but also compares PLMN entries of the EPLMN lists. Hence, it is possible to effectively perform EPLMN list update.

According to the first to fourth exemplary embodiments, when a message is newly received from the PLMN, the mobile terminal 100 does not immediately replace an existing EPLMN list with a new EPLMN list of the received message. The mobile terminal 100 determines for the presence of an EPLMN list in the received message before EPLMN list update, thereby preventing unnecessary EPLMN list removal. In addition, through EPLMN list comparison, the mobile terminal 100 may keep the EPLMN list in a manner that the EPLMN list has as many PLMN entries as possible.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for Equivalent Public Land Mobile Network (EPLMN) list management in a mobile terminal, the method comprising:
   receiving a message from a network after storing an EPLMN list having at least one PLMN entry;
   determining whether an EPLMN list is present in the received message; and
   performing EPLMN list management by maintaining, when an EPLMN list is not present in the received message, the stored EPLMN list.

2. The method of claim 1, wherein the message corresponds to one of a location update accept message, an attach accept message, and a routing area update accept message.

3. The method of claim 1, wherein the message comprises a PLMN identifier.

4. The method of claim 3, further comprising determining, when an EPLMN list is not present in the received message, whether the PLMN identifier of the received message is equal to that of a message having carried the stored EPLMN list.

5. The method of claim 4, wherein the performing of the EPLMN list management comprises:
   maintaining, when the PLMN identifier of the received message is equal to that of the message having carried the stored EPLMN list, the stored EPLMN list; and
   updating, when the PLMN identifier of the received message is not equal to that of the message having carried the stored EPLMN list, the stored EPLMN list with an EPLMN list of the received message.

6. The method of claim 1, further comprising updating, when an EPLMN list is present in the received message, the stored EPLMN list with the EPLMN list of the received message.

7. The method of claim 1, further comprising determining, when an EPLMN list is present in the received message, whether the EPLMN list of the received message is included in the stored EPLMN list.

8. The method of claim 7, wherein the performing of the EPLMN list management comprises:
   maintaining, when the EPLMN list of the received message is included in the stored EPLMN list, the stored EPLMN list; and
   updating, when the EPLMN list of the received message is not included in the stored EPLMN list, the stored EPLMN list by adding a PLMN entry not belonging to the stored EPLMN list to the stored EPLMN list.

9. The method of claim 1, wherein the network sending the message is different from the network sending a message having carried the stored EPLMN list.

10. The method of claim 9, further comprising determining whether the received message is sent by a PLMN listed in the stored EPLMN list.

11. The method of claim 10, wherein the determining of whether an EPLMN list is present in the received message is performed when the received message is sent by a PLMN listed in the stored EPLMN list.

12. The method of claim 10, further comprising updating, when the received message is sent by a PLMN not listed in the stored EPLMN list, the stored EPLMN list with the EPLMN list of the received message.

13. The method of claim 11, wherein the performing of the EPLMN list management comprises:
   determining, when an EPLMN list is present in the received message, whether the EPLMN list of the received message is included in the stored EPLMN list; and
   maintaining, when the EPLMN list of the received message is included in the stored EPLMN list, the stored EPLMN list.

14. The method of claim 13, wherein the performing of the EPLMN list management further comprises updating, when the EPLMN list of the received message is not included in the stored EPLMN list, the stored EPLMN list by adding a PLMN entry not belonging to the stored EPLMN list to the stored EPLMN list.

15. A mobile terminal comprising:
   a wireless communication unit for receiving a message from a network;
   a storage unit for storing an EPLMN list having at least one PLMN entry; and
   a control unit for determining, when a message is received through the wireless communication unit, whether an EPLMN list is present in the received message, and for maintaining, when an EPLMN list is not present in the received message, an existing EPLMN list stored in the storage unit.

16. The mobile terminal of claim 15, wherein the message corresponds to one of a location update accept message, an attach accept message and a routing area update accept message.

17. The mobile terminal of claim 15, wherein the message comprises a PLMN identifier.

18. The mobile terminal of claim 17, wherein the control unit determines, when an EPLMN list is not present in the received message, whether the PLMN identifier of the received message is equal to that of a message having carried the stored EPLMN list.

19. The mobile terminal of claim 18, wherein the control unit manages the EPLMN list by maintaining, when the PLMN identifier of the received message is equal to that of the message having carried the stored EPLMN list, the stored EPLMN list, and updating, when the PLMN identifier of the received message is not equal to that of the message having carried the stored EPLMN list, the stored EPLMN list with an EPLMN list of the received message.

20. The mobile terminal of claim 15, wherein the control unit updates, when an EPLMN list is present in the received message, the stored EPLMN list with the EPLMN list of the received message.

* * * * *